A. BARR & W. STROUD.
MEANS FOR USE IN ASSOCIATION WITH RANGE FINDERS.
APPLICATION FILED NOV. 11, 1913.
1,164,326.                                Patented Dec. 14, 1915.
                                                 2 SHEETS—SHEET 1.
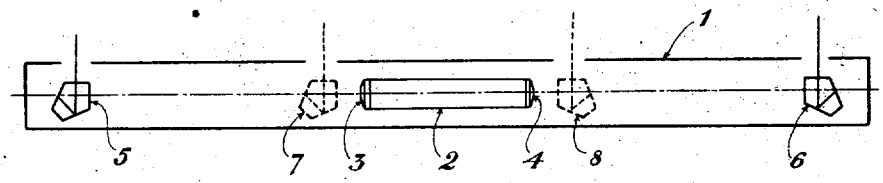
FIG: 1.
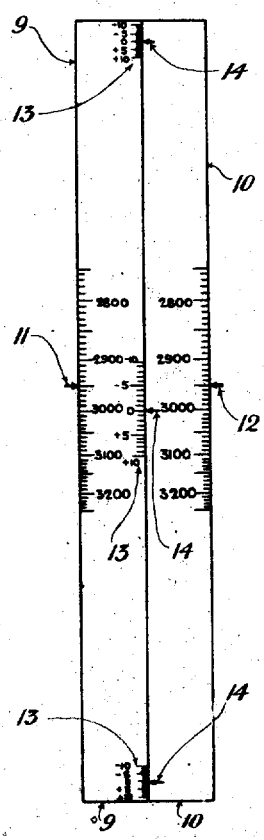
FIG: 2.
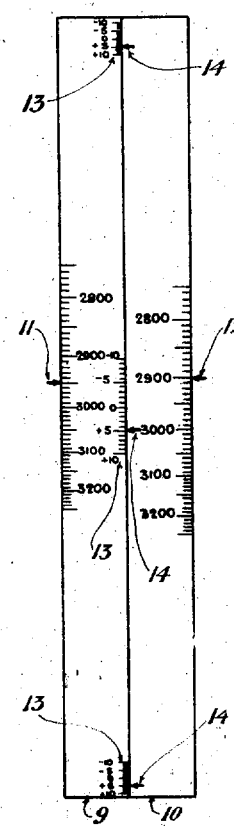
FIG: 3.
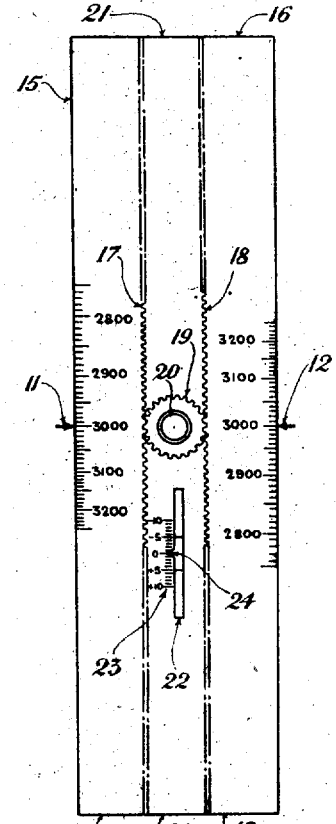
FIG: 4.
Witnesses.
G. Manning
C. W. Fowler
Inventors.
Archibald Barr.
William Stroud.
By T. Walter Fowler
       atty.

A. BARR & W. STROUD
MEANS FOR USE IN ASSOCIATION WITH RANGE FINDERS.
APPLICATION FILED NOV. 11, 1913.
1,164,326.
Patented Dec. 14, 1915.
2 SHEETS—SHEET 2.
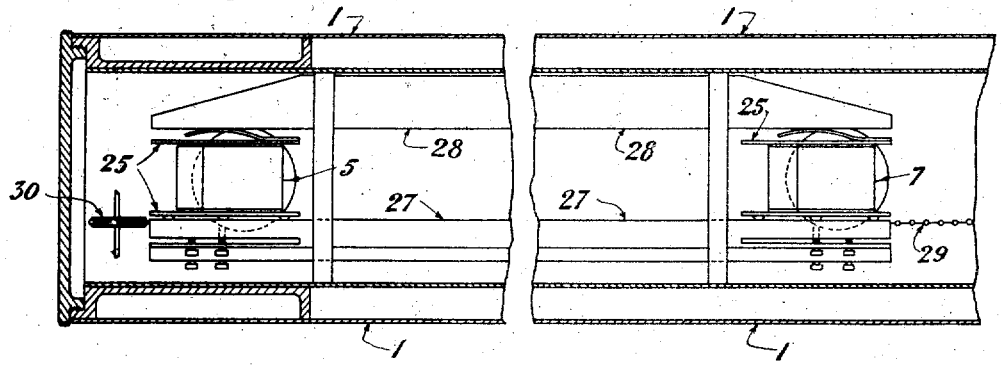
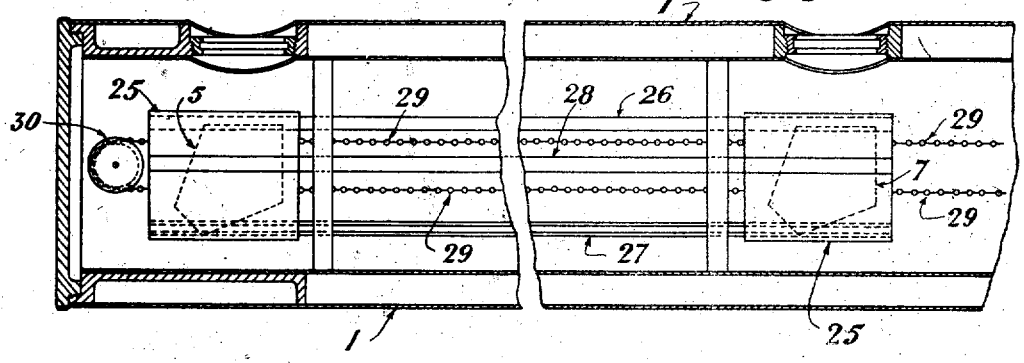
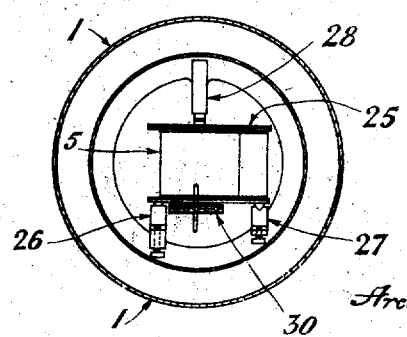
Witnesses.
C. W. Fowler
G. Manning
Inventors
Archibald Barr
William Stroud
By T. Walter Fowler
atty.

UNITED STATES PATENT OFFICE

ARCHIBALD BARR AND WILLIAM STROUD, OF ANNIESLAND, GLASGOW, SCOTLAND.

MEANS FOR USE IN ASSOCIATION WITH RANGE-FINDERS.

1,164,326.  Specification of Letters Patent.  Patented Dec. 14, 1915.

Application filed November 11, 1913. Serial No. 800,341.

*To all whom it may concern:*

Be it known that we, ARCHIBALD BARR and WILLIAM STROUD, subjects of the King of Great Britain and Ireland, and both of 5 Caxton street, Anniesland, Glasgow, Scotland, have invented new and useful Improvements in Means for Use in Association with Range-Finders, (for which we have made application for patent in Great Britain, No. 26,533, bearing date November 16, 1912,) of which the following is a specification.

This invention relates to the provision of apparatus for use in conjunction with a rangefinder having a normal base and alternatively a reduced base which may be associated in construction with the rangefinder for which it is to be used, or provided as a separate apparatus, the apparatus comprising two reciprocal scales of ranges, each capable of adjustment relative to an index, and a subsidiary scale and subsidiary index, the adjustment of one of the reciprocal scales of ranges being adapted to be made in accordance with ranges indicated when the rangefinder was used on an object with the reduced base and the adjustment of the other reciprocal scale of ranges being adapted to be made in accordance with ranges indicated when the rangefinder was used on the same object with the normal base, the adjustment of the two scales of ranges affecting the relative adjustment of the subsidiary scale and subsidiary index, and thereby indicating whether the readings correspond, or the extent to which they differ in terms of measurement corresponding to the extent of adjustment required to be effected in the adjusting gear, with which such rangefinders are provided, in order to adjust the rangefinder for correct readings.

Rangefinders in conjunction with which apparatus according to this invention are adapted to be used are of the self-contained base type having an optical square at each end of the base and a double telescopic system situated optically between such optical squares. In one form of rangefinder of this type the double telescopic system occupies only a portion of the length between the optical squares, with provision for moving one or both of the optical squares along the optical axes of the double telescopic system so as to reduce the base length, in order (for the purpose of testing the instrument as to adjustment), to enable observations to be taken on a distant object using the normal base length, and the readings from these observations are the readings which are compared by the use of apparatus constructed according to this invention. If the range of a target is changing uniformly three observations may be taken, for example, (1) with the long base, (2) with the short base, and (3) with the long base again, and the mean of the two ranges taken with the long base may be compared with the range observed when using the short base.

A rangefinder and some examples of apparatus adapted for use in conjunction therewith in accordance with this invention will now be described with reference to the accompanying drawing, in which:—

Figure 1 is a diagrammatic plan partly in section of a rangefinder suitable for use in conjunction with means according to this invention. Figs. 2 and 3 are elevations of an appliance, and Fig. 4 is an elevation of a modified appliance, adapted to be associated in construction with a rangefinder or in the construction of a separate apparatus according to this invention. Figs. 5, 5ª show in sectional elevation, Figs. 6, 6ª show in sectional plan, and Fig. 7 is an end view of one end of a rangefinder suitable for use in conjunction with means according to this invention.

In Fig. 1 there is represented a rangefinder having an outer tube 1 in which is suitably supported a double telescopic system 2 adapted for coincidence (erect or invert), stereoscopic or other measurement of angles, with objectives 3 and 4 looking, the former to the left and the latter to the right. It is unnecessary to show such optical details as eyepiece prisms and eyepiece, or eyepieces, between the objectives, as these may be of a very large variety of types, such, for example, as that described by Barr and Stroud, the present applicants, in Patent No. 944649 of 1909. 5 and 6 are two end-reflectors in their normal position for range-finding when using the normal or long base of the instrument. These end-reflectors 5 and 6 are shown as pentagonal doubly reflecting prisms, but they may be constructed after the fashion of any other type of optical square. For purposes of adjustment the end-reflectors 5 and 6 may be transferred by any suitable mechanism to the positions 7 and 8 respectively when a new observation of the range may be obtained using the shortened base. For example, as shown at Figs. 5, 5ª, 6, 6ª and 7 which represent the left hand end of a rangefinder as shown diagrammatically at Fig. 1, a holder 25 is provided into which the prism 5 is fixed. The holder 25 is guided by rails 26, 27 and 28, so that the prism 5 may be moved from its normal position to the position 7. This may conveniently be done by means of a chain 29 carried over pulleys, one at each end of the instrument, one of which 20 is shown, the holder 25 of the prism 5 being attached to one stretch of the chain 29 and the prism 6 (see Fig. 1) to the other, so that the prisms 5 and 6 may be moved simultaneously from their normal positions to the positions 7 and 8. The chain 29 may conveniently be driven by means, not shown in the drawings, operated by a handle outside the tube 1. It will be obvious that the guidance of the prism holders may be carried out in other ways than that shown, and that other means than that shown may be adopted for moving the end prisms between their normal and the inner positions. In the first instance, suppose that two scales are provided in the rangefinder, one for use with the long base and the other for use with the short base. If the two readings of range are identical, no adjustment is required, but if the readings are different, adjustment is required, which may be effected by operating the adjusting gear with which such rangefinders are provided, for example, in accordance with an adjusting gear scale graduated in divisions corresponding to equal changes of parallax of any convenient amount, and by the use of apparatus according to this invention the extent of adjustment required relative to the readings compared is indicated. According to this invention we provide apparatus associated in construction with the rangefinder (or separate therefrom) consisting of two reciprocal scales of equal length which may conveniently be engraved upon two graduated rings, as shown in Figs. 2 and 3, rotatable on any suitable carrier, for example, the rings may be placed around the tube of the rangefinder. As shown, 9 is the ring upon which the readings of range corresponding to the long base can be set off and 10 that upon which the readings of range for the short base can be set off, at the fixed indexes 11 and 12 respectively. In the case of Fig. 3 the reading as determined by means of the long base is 2950 meters, and the ring 9 is shown as having been rotated until the 2950 meters mark is placed opposite the index 11. The reading as given by the short base is 2900 meters and the ring 10 is shown as having been rotated until the 2900 meters mark is placed opposite the index 12. Upon the portions of the rings 9 and 10 in contact are engraved short subsidiary scales 13, on, say, the ring 9, and corresponding subsidiary indexes 14 upon the periphery of 10, whereby the relative displacements of the two rings 9 and 10 can be read off. Thus in Fig. 3 after setting off 2950 meters upon the long base scale 9, and 2900 on the short base scale 10, the index 14 reads +5.0 upon the scale 13, and this represents the alteration required to be made upon the adjusting gear scale of the range finder mentioned above, the magnitudes of the division upon the latter scale and those on the subsidiary scale 13 having been arranged to correspond in this respect. In Fig. 2 is represented the case where the readings with the long base and with the short base are each 2950 meters, when the scale 13 and index 14 indicate, of course, that no change in the adjustment is required. If the reciprocal scales upon 9 and 10 extend over a considerable fraction of the circumference, it is desirable to reproduce the subsidiary scales 13 and subsidiary indexes 14 at several places so that the adjustment required may be read off easily from one and the same place of observation, whatever the values of the ranges measured. Two such subsidiary scales and indexes are shown at the top and bottom of Figs. 2 and 3.

Fig. 4 shows a modification whereby the place of observation of the adjustment correction is in a fixed position. Here the rings 9 and 10 are replaced by rings 15 and 16, which are provided with teeth 17 and 18, respectively, gearing into a pinion 19, mounted upon a pin 20, fixed to a ring 21. The rings, 15, 16 and 21, are rotatable on any suitable carrier, and the ring 21 carries a subsidiary scale 23 (similar to 13 Figs. 2 and 3) which moves opposite a subsidiary index pointer 24 (fixed relatively to the indexes 11 and 12), placed in the slot 22 cut in the ring 21. The indexes 11 and 12 and index pointer 24 may be fixed upon the aforesaid carrier. In this case, however, the reciprocal scale upon 16 is graduated in the opposite sense to that upon 15 as shown in the figure. The initial setting of the various parts is such that when the readings of the two scales upon 15 and 16 are the same, the subsidiary index pointer 24 is opposite 0 of the scale 23. If, however, the long base reading is 3000 meters and the short base reading is 2950 meters, and these numbers are set off opposite the indexes 11 and 12, the pinion 19 will be rotated carrying the ring 21 and subsidiary scale 23 past the fixed subsidiary index pointer 24, and thereby the required change in adjustment may be determined.

In cases where only one scale of ranges is provided in the rangefinder, viz., that for the long base, we may use this scale for adjusting purposes in the following way:— Suppose the long base = $n \times$ short base, then the rangefinder when in adjustment ought to indicate $n$ times the range with the short base that it does with the long base. In order to adapt the method of reading the required correction for this case, all that is necessary is to replace the scale upon the ring 10 (Figs. 2 and 3) or the ring 16 (Fig. 4) by a scale having the length from the infinity mark to any given range indication $n$ times the length between the corresponding marks on the scale or ring 9 (or the ring 15). Thus, for example, if the short base reading is one-third of the normal base length reading of the rangefinder, the scale on 10 (or 16) will have three times the length from infinity to 1000 meters that the corresponding interval on the scale 9 (or 15) has. In other words 10 (or 16) will have the same length from the infinity mark to 3000 meters as the scale on 9 (or 15) has for its infinity mark to the indication 1000 meters.

The rings 9 and 10 (or 15, 16 and 21) need not be on the rangefinder itself, but might, for example, be upon the mounting, or associated in the construction of a separate apparatus, and obviously other arrangements of scale (such, for example, as scales on disks or strips) may be used instead of scales upon rings.

It will be recognized that with a rangefinder of the example illustrated instead of provision being made for moving both the prisms 5 and 6, one only need be so mounted to produce an alteration of the length of the optical base of the rangefinder.

We claim:—

1. Apparatus for use in conjunction with a rangefinder having a normal base and alternatively a reduced base, comprising two reciprocal scales of ranges, each capable of adjustment relative to an index, and a subsidiary scale and subsidiary index, the adjustment of one of the scales of ranges being adapted to be made in accordance with readings of ranges indicated when the rangefinder was used on an object with the reduced base and the adjustment of the other scale of ranges being adapted to be made in accordance with readings of ranges indicated when the rangefinder was used on the same object with the normal base, the adjustments of the two scales of ranges affecting the relative adjustment of the subsidiary scale and subsidiary index, for the purposes set forth.

2. Apparatus for use in conjunction with a rangefinder having a normal base and alternatively a reduced base, comprising two reciprocal scales of ranges, two indexes, one for each scale, the scales of ranges being each capable of adjustment to its respective index, one of the scales in accordance with the readings of ranges indicated when the rangefinder was used with the short and the other with the long base, and a subsidiary scale and subsidiary index for indicating the required correction, for the purposes set forth.

3. Apparatus for use in conjunction with a rangefinder having a normal base and alternatively a reduced base, comprising two reciprocal scales of ranges of the same spacing, two indexes, one for each scale, the scales of ranges being each capable of adjustment to its respective index, one of the scales in accordance with the readings of ranges indicated when the rangefinder was used with the short base and the other with the long base, and a subsidiary scale and subsidiary index, for the purposes set forth.

4. Apparatus for use in conjunction with a rangefinder having a normal base and alternatively a reduced base, consisting of two rotatable rings, a reciprocal scale upon each of the rings, two indexes, one for each reciprocal scale, a subsidiary scale and index, for the purposes set forth.

5. Apparatus for use in conjunction with a rangefinder having a normal base and alternatively a reduced base, consisting of two rotatable scale rings, a reciprocal scale upon each of the rings, two indexes, one for each reciprocal scale, a third rotatable ring, a subsidiary scale on the third ring, a subsidiary index fixed relatively to the said two indexes, and means for moving the third ring in accordance with the differential adjustments of the scale rings, for the purposes set forth.

ARCHIBALD BARR.
WILLIAM STROUD.

Witnesses:
NEIL T. MACLEAN,
JAMES WEST FRENCH.